July 2, 1963          S. N. MATHESON          3,095,730
APPARATUS FOR TESTING BEARINGS
Filed March 2, 1960
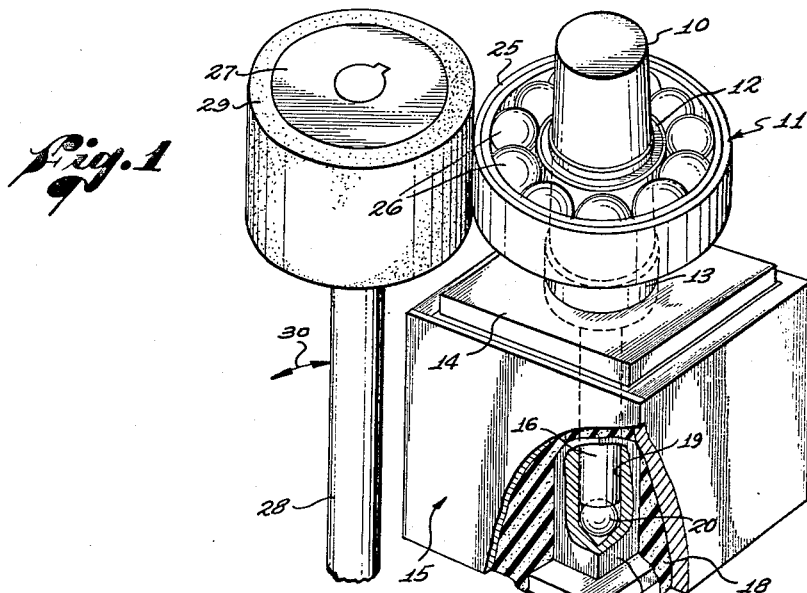
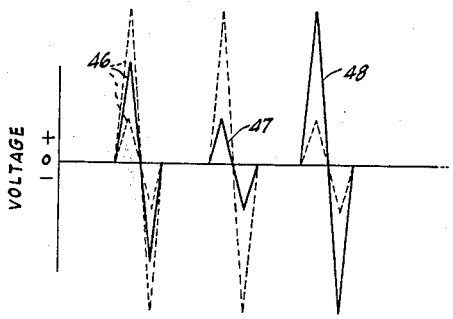
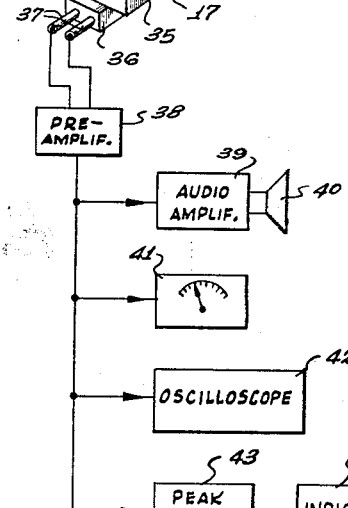
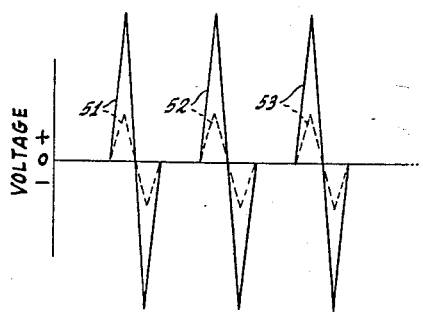
INVENTOR.
STUART N. MATHESON
BY *Fulwider Mattingly & Huntley*
Attorneys

United States Patent Office 3,095,730
Patented July 2, 1963

3,095,730
APPARATUS FOR TESTING BEARINGS
Stuart N. Matheson, Norwalk, Calif., assignor to Bearing Inspection, Inc., Huntington Park, Calif., a corporation of California
Filed Mar. 2, 1960, Ser. No. 12,424
2 Claims. (Cl. 73—67)

This invention relates to testing apparatus, and more particularly to a unique analyzer for detecting faults in ball bearing structures and the like.

In many types of apparatus that employ rotating elements, it is essential that the elements rotate freely with a minimum of friction. For this purpose, it is common to support the elements for rotation in ball bearings. However, ball bearings vary widely in quality, and occasionally they have serious flaws that go undetected. Such bearings fail to provide the desired frictionless mounting for an element, and may even result in operating failure. Where highly complex and expensive equipment is involved, poor bearings obviously cannot be tolerated.

Flaws in ball bearings may occur in a number of places in manufacture. For example, one or both of the confronting surfaces of the inner and outer races, or even one or more balls, may be unduly rough. And faults, such as nicks, cracks and the like, may be located in one or more of these elements. As will be apparent, information on various characteristics of a fault is invaluable to the bearing manufacturer. He can use this information to determine what items of equipment, or what parts of his production line, are responsible for the faults, and make whatever corrections are needed to improve his products.

Various attempts have heretofore been made to determine the existence, size, location and nature of bearing faults. For example, a sound or vibration pickup has heretofore been employed to develop signals representing the sounds created in operation of a bearing. Such signals are amplified and applied to a loudspeaker for reproducing the corresponding sounds. Such a system relies entirely on the bearing ability of the individual who is testing the bearing. As will be apparent, it is impossible to detect many types of flaws in this manner.

Among other attempts to detect flaws in bearings are included a pickup device employing a vertically movable "tracer" element. Such an element rides on the outer race of a bearing that is mounted on a rotatable shaft. The operator manually holds the outer race stationary while the shaft is rotated, and movements of the tracer element, in following vertical movements of the bearing thereunder that result from flaws, creates corresponding voltages. Such voltages are employed directly to establish meter deflections, and graph recordings, of the tracer movements. Also, such voltages are applied to a number of filters that are designed to pass only certain frequency components thereof, and meters are coupled to the filters to provide indications of the variations in amplitude of such frequency components.

One difficulty with such tracer devices is that they require the operator to divert his attention from the indicators to assure himself, as best he can, that the outer race is being held stationary. Another disadvantage is that a great deal of interpolation of the various indications is required to determine the types of flaws that exist in a bearing.

It is an object of this invention to provide a unique system for indicating a variety of flaws in rotatable elements without the disadvantages of prior art analyzers.

It is another object of this invention to provide a bearing analyzer system that employs unique means to establish direct indications of a variety of flaws in parts of a bearing.

A further object of this invention is to provide a bearing analyzer that automatically establishes easily observable indications of bearing faults, and which does not require the degree of interpolation that is necessary in prior art analyzers.

It is yet another object of this invention to provide a bearing analyzer system that combines different types of visual indicators in a unique manner to readily identify flaws of various types in a ball bearing structure.

It is also an object of this invention to provide a unique bearing analyzer that comprises a minimum number of component parts of simple design and rugged construction, capable of reliable operation over a long operating life.

The above and other objects and advantages of this invention will be more clearly understood from the following description taken in conjunction with the accompanying drawing of an illustrative embodiment thereof, in which:

FIGURE 1 is a perspective view, partly broken away, of a bearing support used in testing a bearing, showing a drive wheel for rotating the outer race of a bearing having its inner race on an arbor, showing the arrangement of the arbor and a shaft for transmitting vibrations to a transducer, and showing a block diagram of my electronic network for reproducing the sounds audibly, indicating the magnitude of the sounds, showing the characteristic wave shapes of the sounds, and providing lighting indications;

FIGURE 2 is a plot of the voltage waveforms that appear on the oscilloscope screen as a result of faults in the outer race; and FIGURE 3 is a plot of the voltage waveforms that appear on the oscilloscope screen as a result of faults on the inner race.

Unless specified, parts herein preferably are of metal. Referring to FIGURE 1, a bearing analyzer in accordance with this invention employs a vertical spindle or bearing adapter element 10 on which a bearing 11 to be tested is mounted. Preferably the adapter 10 is tapered so that the diameters along two spaced portions thereof are smaller and larger than the inner diameter of the inner race 12 of the bearing 11. The large end of the tapered portion terminates in a cylindrical portion 13 that extends through a cover element 14 at one end of a housing 15.

The cylindrical portion 13 of the adapter 10 is integral with a rod or arbor 16 that extends into a shaft element 17. The shaft 17 is held in the housing so that it can vibrate transversely, but cannot rotate. Toward this end, the shaft 17 is made non-circular, e.g., square as shown, and a resilient cushion 18 fills the space in the housing around the shaft 17. The material of the cushion 18 may, for example, be sponge rubber, and is packed tightly enough to hold the shaft 17 in the desired manner.

The arbor 16 is preferably a very straight, highly polished rod, and the bore 19 in the shaft 17 is closely machined to snugly and slidably receive the arbor 16. The lower end of the arbor 16 rests on a thrust bearing, shown as a spherical or ball element 20. The ball 20 is of substantially the diameter of the bore 19, so as to be snugly disposed therein. With this arrangement, the arbor can be turned with a minimum of friction while being maintained firmly coaxial with the shaft 17.

With apparatus constructed as above described, the outer race 25 of the bearing 11 is rotated, whereby to effect rotation of the balls 26 located between the races 12, 25, but in a manner so as not to effect angular movement of the inner race 12 and the adapter 10. Rotation of the outer race is established by means of a drive wheel 27 mounted on a motor-driven shaft 28 that is parallel to the axis of the adapter 10. The drive wheel 27 is provided with a coating or sleeve 29 of resilient material, such as sponge rubber.

The shaft 28 and its drive wheel are movable toward and away from the bearing 11, as indicated by the arrows 30, and are preferably normally biased toward the bearing 11. For this purpose, the shaft 28 and its motor may be supported by a bracket (not shown) that is hinged for movement about a parallel axis, and which is urged toward the bearing by conventional springs.

The drive wheel is held so that the resilient sleeve engages the outer race 25 only lightly, and enough so that such outer race rotates with the sleeve 29 without any slippage. Thus engaged, the outer race 25 is biased, at the point of contact by the sleeve 29, toward the inner race 12. Due to the usual radial "play" between the inner and outer races that is allowed by manufacturing tolerances, this results in the outer race 25 being moved radially, when engaged by the sleeve 29, to a position wherein the shortest distance between the races is along the radii of the drive wheel 27 and the adapter 10 and between the sleeve 29 and adapter 10. Accordingly, the distance between the races is greatest along the same line, but 180° around the adapter 10. In this connection, the cushion 18 is sufficiently firm so that the biasing of the outer race 25 in this manner does not alter the parallel relation between the adapter 10 and the drive wheel 27.

The above-described radial positioning the outer race 25 by the sleeve 29 establishes an arrangement of the parts wherein a fault on a part causes clicks to be set up, and the adapter 10, arbor 16 and shaft 17 are caused to vibrate transversely. In this manner, the clicks are transmitted to the bottom of the shaft 17.

Sounds reaching the bottom of the shaft 17 are converted into electrical signals that are utilized in determining a flaw in the bearing structure. To this end, a plate 35 is secured to the lower end of the shaft 17, and a transducer 36 is secured to the bottom surface of the plate 35. The transducer 36 may be any suitable type of transducer capable of converting vibrations of the shaft 17 into signals. For example, the transducer 36 may be a seismically mounted, velocity sensitive transducer having output leads 37 across which voltages are developed during warping of the crystal during the vibrations.

The voltages developed by the transducer 36 are raised in amplitude by a preamplifier 38. The output of the preamplifier is coupled to an audio amplifier 39, for effecting audible reproduction of the sounds through a loudspeaker 40. Also coupled to the preamplifier 38 are a meter 41, an oscilloscope 42, and a "peak" detector 43. The operation of these circuits in conjunction with the mechanical structure above described will now be explained.

The meter 41 responds to the output of the preamplifier 38 to provide a corresponding needle deflection. Such needle deflection, of course, is the mechanical equivalent of the intensity of the sound from the loudspeaker 40. In other words, loud sounds from the loudspeaker and wide meter movements reflect large faults, and weak clicks and small needle deflections represent small faults.

The clicks heretofore referred to occur whenever a ball 26 passes by a fault in a race, or where a fault in a ball is caused to engage a race. Clearly, if the fault is large, a greater vibration will occur than for a small fault. Correspondingly, needle deflections of the meter 41, and sounds from the loudspeaker 40, clearly reflect the existence and size of a fault.

The oscilloscope 42 is the means for determining the location of a fault, i.e., whether a fault is on a ball or on either of the races. Consider, for example, the situation where a fault is located in the outer race. If the fault is in line with the contacting portion of the sleeve 29 when such fault is engaged by a ball 26, such contact is made along a line of closest mechanical coupling. If a ball contacts the fault in the outer race at a point 180° from the contacting portion of the sleeve 29, such contact is made along a line of loosest mechanical coupling. The greatest vibration (loudest click) occurs at the point of closest coupling and the weakest vibration (weakest click) occurs at the point of loosest coupling. Vibrations created by balls engaging outer race faults at other positions vary in intensity between these two extremes.

The operation of the system of this invention for detecting a fault in the outer race 25 will be explained by reference to FIGURE 2 along with FIGURE 1. A fault in the outer race 25 rotates, of course, at the speed of rotation of the race. Since the balls 26 are caused to roll by the action of the outer race, the fault does not pass by each ball during a single revolution, but engages only a few, e.g., three in a typical bearing. However, it will be apparent that the actual number of balls engaged by a fault throughout a revolution of the race will be dictated by the geometry of the bearing.

FIGURE 2 illustrates three spaced voltage excursions 46, 47, 48 that are obtained on the oscilloscope screen during a revolution of the outer race of a typical bearing. As indicated for the voltage 46, the voltages 46–48 vary in amplitude from revolution to revolution, between maximum and minimum peaks. Also, the voltages 46–48 in any one revolution are all different in magnitude. Thus, the voltages 46–48 appear to be dancing up and down and out of step. Accordingly, the presentation on the screen of such voltages is indicative that a bearing has an outer race fault.

FIGURE 3 illustrates three spaced voltage excursions 51–53 that are presented by the oscilloscope during a revolution of the outer race, when there is an inner race fault. The voltages are maximum when the fault is located between the adapter 10 and the sleeve 29, and on a radius line through the point of contact of the sleeve 29 with the outer race 25. The voltages are minimum when the fault is positioned 180° away from the position for the maximum voltages.

Whenever the fault on an inner race is located, all the voltages 51–53 are of the same amplitude, and remain, at such amplitude. Accordingly, the presentation of voltages of fixed amplitude signifies the existence of an inner race fault.

The voltage presentation for an inner race fault is also useful in accurately locating the fault. Since the height of the voltages peaks is determined by the position of the fault, it is necessary only to rotate the adapter 10 by hand, thereby rotating the inner race 12 with it, until the peaks are maximum. This will indicate that the fault is located in line with the point of engagement of the sleeve 29 and the outer race, and on the same side of the adapter. As will be seen, the arrangement of the bearing 20 and the arbor 16 permits selective angular positioning of the adapter 10 with a minimum of resistance.

A fault in a ball gives rise to a very erratic voltage variations. Typically, spaced voltage peaks may appear and then disappear altogether for a number of revolutions. This occurs because the axis of rotation of a ball varies considerably. The oscilloscope presentation of such erratic voltages is a criterion for classifying the fault as one on a ball.

In certain situations, there are no clicks and accompanying sharp vibrations, such as where one or more of the races and balls have rough surfaces. Such a condition results in rapid vibrations that are too low in amplitude to be noted on the oscilloscope. In this case, reliance is had on the meter 41. The needle position remains steady, and the corresponding voltage is compared to voltage readings representing tolerable and intolerable surface conditions of such parts.

In all of the foregoing situations, the loudspeaker 40 serves as an aid in analyzing a fault. As will be appreciated, the operator can help, to the extent possible for him, to determine the existence of faults by coordinating the sounds heard from the loudspeaker and the visual presentations on the meter 41 and the oscilloscope 42.

The peak detector 43 is a circuit that helps to provide a further aid to fault detection. This detector may be a bistable multivibrator which in one state prevents a voltage from being applied to the indicator 44. When the threshold of the multivibrator is exceeded by a signal from the preamplifier, the multivibrator flips to its other state, and the indicator (e.g., a lamp) is operated. Subsequently, the multivibrator can be reset in a conventional manner.

While the foregoing describes one form of the invention, it will be apparent that various modifications can be made without departing from the spirit and scope of this invention. Accordingly, it is not intended that this invention be limited, except as by the appended claims.

I claim:

1. A system for establishing whether a flaw in a bearing is in the outer race, the inner race, or a ball between the races, and signifying the nature and magnitude of the flaw, comprising: a hollow housing; a vertical noncircular metal rod extending through said housing, said rod having a cylindrical opening extending from one end of said rod to a point adjacent the opposite end thereof; a mass of resilient material filling said housing and holding said rod against rotation, said mass permitting said rod to undergo translatory vibrations; a cylindrical metal arbor matingly received in said cylindrical opening so as to be rotatable but not capable of transverse movement relative to said rod, the length of said arbor being greater than the length of said opening; a metal bearing adapter releasably mounted on the outer end of said arbor to snugly receive and hold the inner race of a bearing; drive means including a vertical padded drive wheel for frictionally engaging and rotating the outer race of a bearing to be placed on the adapter, the axis of said drive wheel being parallel to the axis of said arbor, said drive wheel biasing the outer race laterally so the minimum distance between the outer and inner races is along the horizontal line through the races and between said arbor and drive wheel; and means coupled to said rod and operable to develop and display, for a flaw in the inner race, voltage waveforms of substantially uniform magnitude, and, for a flaw in the outer race, voltage waveforms with generally cyclical variations in magnitude, and, for a flaw in a ball, voltage waveforms of randomly varying magnitude.

2. A bearing analyzer comprising: a rod-like element around which the inner race of a bearing to be tested is placed; means for rotating the outer race of the bearing to be tested; means supporting said element for vibratory movement in response to a flaw in the bearing under test; transducer apparatus having means for sensing the vibrations and developing corresponding voltages; indicating means coupled to said transducer apparatus and operable to provide an indication of the location and magnitude of the flaw in the bearing under test, said indicating means including an audio amplifier; an oscilloscope; a meter; a voltage peak detector; a preamplifier coupling said audio amplifier, said oscilloscope, said meter, and said peak detector to said transducer apparatus; a lighting indicator coupled to said peak detector; a loudspeaker coupled to said audio amplifier; means to operate said oscilloscope to visually display voltage waveforms of substantially uniform magnitude and spacing to signify sharp vibrations resulting from a flaw in an inner race, to visually display voltage waveforms of generally cyclical variations in magnitude to signify spaced vibrations resulting from a flaw in an outer race, and to visually display voltage waveforms of randomly varying magnitude and spacing to signify sharp vibrations resulting from a flaw in a ball; means to operate said meter to signify small, steady vibrations resulting from a rough surface of a race; and means to operate said lighting indicator through said peak detector in response to any vibrations that exceed a predetermined magnitude.

References Cited in the file of this patent

UNITED STATES PATENTS

| | | |
|---|---|---|
| 2,009,997 | Germond | Aug. 6, 1935 |
| 2,608,090 | Barker et al. | Aug. 26, 1952 |
| 2,763,152 | Birdsall | Sept. 18, 1956 |
| 2,785,566 | Mims | Mar. 19, 1957 |
| 3,023,604 | Gordon et al. | Mar. 6, 1962 |